United States Patent [19]

Gasparro et al.

[11] Patent Number: 4,716,012
[45] Date of Patent: Dec. 29, 1987

[54] REACTOR INTERNALS LOOSE PARTS STRAINER

[75] Inventors: Michael R. Gasparro, Penn Hills; Richard E. Tome, Murrysville, both of Pa.

[73] Assignee: Westinghouse Electric Corp., Pittsburgh, Pa.

[21] Appl. No.: 785,307

[22] Filed: Oct. 7, 1985

[51] Int. Cl.⁴ .................. G21C 9/00; G21C 15/00
[52] U.S. Cl. ................................ 376/352; 376/203; 376/285; 376/313; 376/399; 210/477
[58] Field of Search ............. 376/352, 377, 389, 399, 376/285, 400, 313, 203, 205

[56] References Cited

U.S. PATENT DOCUMENTS

| T921,019 | 4/1974 | Barry | 376/399 |
| 3,060,111 | 10/1962 | Sherman et al. | 376/399 |
| 3,255,088 | 6/1966 | Sprague et al. | 376/400 |
| 3,486,973 | 12/1969 | Georges et al. | 376/399 |
| 3,809,610 | 5/1974 | Smith et al. | 376/400 |
| 4,001,079 | 1/1977 | Rylatt | 376/400 |
| 4,096,032 | 6/1978 | Mayers et al. | |
| 4,170,517 | 10/1979 | Meuschke et al. | 376/205 |
| 4,412,969 | 11/1983 | Tilbrook et al. | 376/352 |
| 4,490,328 | 12/1984 | Schoening et al. | 376/389 |

FOREIGN PATENT DOCUMENTS 715404 12/1972 Italy .................. 376/377

Primary Examiner—Harvey E. Behrend
Attorney, Agent, or Firm—Daniel C. Abeles

[57] ABSTRACT

An upwardly convex resilient annular strainer, fixed to the secondary core support base plate in a PWR, bends to remain in contact with the lower hemispherical head section of the pressure vessel as the gap between the internals and the lower hemispherical head section varies in size with reactor temperature to prevent debris from lodging in the gap where it could lead to reactor damage.

5 Claims, 4 Drawing Figures

REACTOR INTERNALS LOOSE PARTS STRAINER

BACKGROUND OF THE INVENTION

1. Field of the Invention

This invention relates to the internals of a nuclear reactor and more specifically to a strainer which prevents debris from lodging between the secondary lower core support and the hemispherical lower head on the pressure vessel.

2. Prior Art

A pressurized water reactor includes an upright cylindrical pressure vessel with a hemispherical lower head section and a removable hemispherical head bolted to the upper end. A cylindrical core barrel is suspended inside the pressure vessel from a flange extending around the inside of the upper end of the pressure vessel. The core of fissile material is supported inside this core barrel. An upper core support, commonly referred to as the top hat, is clamped down on top of the flange from which the core barrel is suspended by the removable hemispherical upper head. In order to accommodate for tolerances, an annular spring is placed between the flanges on the core barrel and the upper core support.

Reactor coolant is introduced into the pressure vessel near the top of the core barrel, flows downward through the annular space between the core barrel and the inner wall of the pressure vessel known as the downcomer, reverses direction inside the hemispherical lower head section, and flows upward through passages in the bottom of the core barrel and through the reactor core mounted inside the core barrel before being discharged through outlet nozzles. Heat energy generated by the fission reactions in the core is absorbed by the reactor coolant and is utilized to generate steam for use by a turbine-generator in producing electricity.

As a safety precaution, energy absorbers are mounted under the suspended core barrel so that in the very unlikely event that there should be a complete failure of the core barrel suspension system, the impact of the entire core barrel assembly falling on the lower hemispherical head section is lessened to preserve pressure vessel integrity. In such an event, actual contact with the lower hemispherical head would be made by a horizontal secondary core support plate underneath the energy absorbers. In order to keep the kenetic forces in such an accident to a minimum, the gap between the secondary core support plate and the lower hemispherical head section of the pressure vessel is very small. However, due to the differences in the coefficients of thermal expansion of the stainless steel internals and the lower alloy pressure vessel, this gap varies in size over the temperature range to which these components are exposed. Typically, this gap can narrow from 1.06 inches cold to 0.5 inches when the reactor is operating at full power.

Periodically, the reactor is shutdown for refueling. During this sequence, the hemispherical upper head is removed along with the upper core support and the components it supports so that fuel assemblies can be replaced and rearranged. The possibility exists during the refueling procedure for debris to fall down into the lower portion of the vessel. Such debris can include small parts, such as nuts and bolts. Debris can also be introduced into the pressure vessel by circulation of reactor coolant following failure of the hardware or maintenance on other parts of the nuclear steam supply system. For instance, during retubing of the steam generators, small pieces of tubing and pieces of weld material can be left behind despite attempts to clean them out.

If such debris should lodge between the secondary lower core support and the lower hemispherical head section of the pressure vessel when the reactor coolant is cold, it could cause the core barrel to unseat from its support flange as the components heat up, due to the difference in the coefficients of thermal expansion of the internals and the pressure vessel. This in turn, could subject the internals to undesired vibration induced by turbulent reactor coolant flow.

As taught by U.S. Pat. No. 4,096,032, it is known to insert filters in the bottom of the core barrel of a pressurized water reactor temporarily during cold hydrostatic and hot functional testing to collect debris from construction of the nuclear steam supply system. However, this is done before the fuel assemblies are installed and it collects the debris in the lower hemispherical head section of the pressure vessel from which it must be removed prior to operation of the reactor or it will cause the very problem which the present invention seeks to avoid.

It is the primary object of the present invention to provide apparatus which prevents debris from lodging in the gap between the internals and the lower hemispherical head section of the reactor pressure vessel without restricting the flow of reactor coolant, and which does so as the gap varies in size over the full range of temperatures to which the reactor is subjected.

SUMMARY OF THE INVENTION

This and other objects are realized by strainer means which comprises an annular member with apertures therethrough secured to the lower end of the intrenals of a nuclear reactor and extending radially outward to the hemispherical lower head section of the pressure vessel above the gap formed by the bottom of the internals and the inner surface of the lower hemispherical head section. This annular member is a resilient planar device, preferably upwardly convex, which is fixed to the internals and bends to maintain its outer peripheral edge in contact with the lower hemispherical head section as the size of the gap changes with temperature. The means for mounting the annular planar member to the internals can include an annular rim around its inner edge which is welded to the secondary core support base plate.

With this arrangement, debris is prevented from entering the gap between the internals and the lower hemispherical head section of the reactor pressure vessel over the full range in the size of the gap, yet there is always a flow of reactor coolant through the gap to provide cooling for the reactor components.

BRIEF DESCRIPTION OF THE DRAWINGS

A full understanding of the invention can be gained from the following specification when read in conjunction with the accompanying drawings in which.

DESCRIPTION OF THE PREFERRED EMBODIMENT

Figure 1:
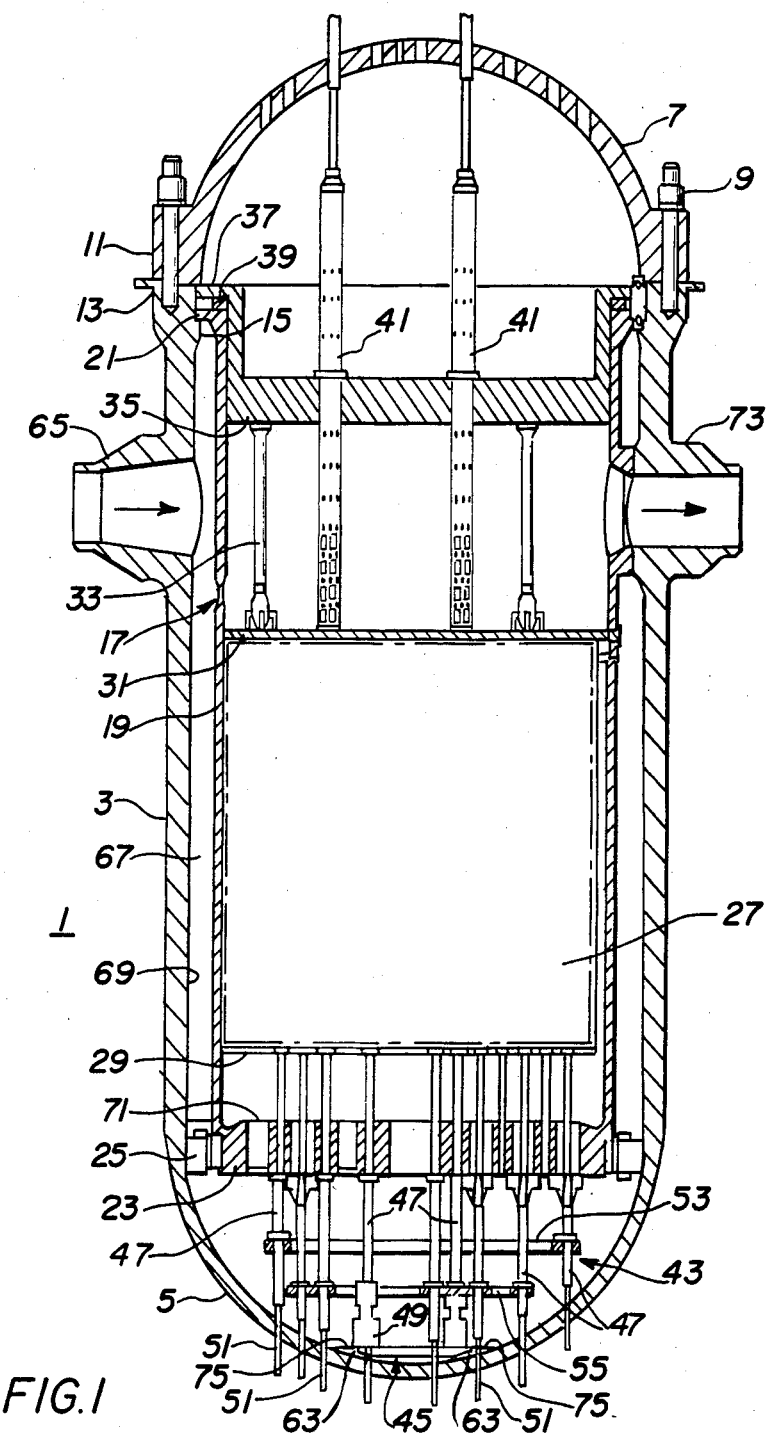
FIG. 1 is a vertical sectional view through a pressurized water reactor incorporating the invention.

FIG. 1 illustrates a typical pressurized water reactor (PWR) to which the invention has been applied. The reactor 1 includes an upright cylindrical pressure vessel 3 having an integral hemispherical lower head section 5 and a removable upper hemispherical head 7. The removable head 7 is secured to the pressure vessel by a plurality of bolts 9 which extend axially through an annular flange 11 on the head and into a confronting flange 13 on the upper end of the cylindrical pressure vessel 3.

The cylindrical pressure vessel 3 also defines an annular, radially inwardly projecting support flange 15 near its upper end on which are supported the reactor internals identified generally by the reference character 17. The internals include a cylindrical core barrel 19 which is suspended inside the pressure vessel 3 by a radially, outwardly extending flange 21 around its upper edge which seats on the support flange 15. The core barrel 19 terminates at its lower end in a thick lower core support 23. Several angularly spaced sliding connections 25 between the lower core support 23 and the adjacent pressure vessel provide lateral support for the lower end of the core barrel while permitting free axial displacement due to differences in the coefficients of thermal expansion of the lower alloy pressure vessel 3 and the stainless steel core barrel 19.

The reactor core 27 is mounted in the core barrel 19 between a lower core plate 29 and an upper core plate 31. The lower core plate 29 is secured to the side walls of the core barrel 19 while the upper core plate 31 is suspended by columns 33 from an upper core support 35. This upper core support 35, which is also referred to as the "top hat", is in turn suspended by a radially outwardly extending flange 37 from the support flange 15 on the inside of the pressure vessel 3 which, as discussed, also supports the core barrel 19. The flanges 37 and 21, on the upper core support and the core barrel respectively, are clamped down onto the flange 13 by the flange 11 on the hemispherical upper head as it is bolted onto the pressure vessel 3. An annular spring 39 between the flanges 37 and 21 takes up any slack created by manufacturing tolerances. Control rod assemblies 41 extending downward through the removable upper head 7, the upper core support 35, and the upper core plate 31, include control rods which are inserted into and withdrawn from the reactor to control reactivity.

A secondary core support 43 is mounted under the core barrel 19. It includes a secondary core support base plate 45 suspended from the lower core support 23 by four columns 47 each supporting an axially crushable energy absorber 49. The energy absorbers 49 reduce the impact forces, and thereby preserve pressure vessel integrity, in the unlikely event that the core barrel suspension system should fail causing the core barrel 19 and reactor core 27 to fall onto the lower hemispherical head section 5.

Conduits 51, known as instrumentation thimbles, extend upward through the lower hemispherical head section 5 of the pressure vessel, through the secondary core support base plate 45, the energy absorbers 49, the columns 47, and the lower core support 23 and into the reactor core 27. Additional instrumentation thimbles 51 extend upward through additional columns 47 suspended from the bottom of the lower core support and into the reactor core at selected locations across the core. Apertured horizontal plates 53 and 55 provide a rigid framework for supporting the columns 47.

Figure 2:
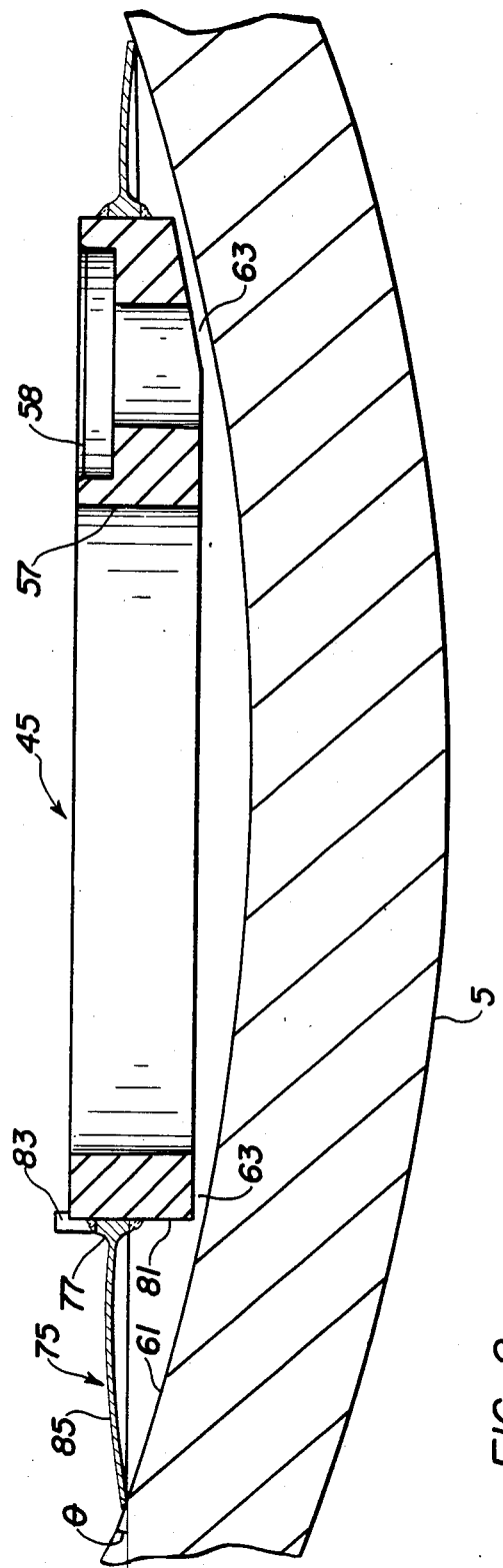
FIG. 2 is an enlarged portion of FIG. 1 with some parts removed for clarity.
Figure 3:
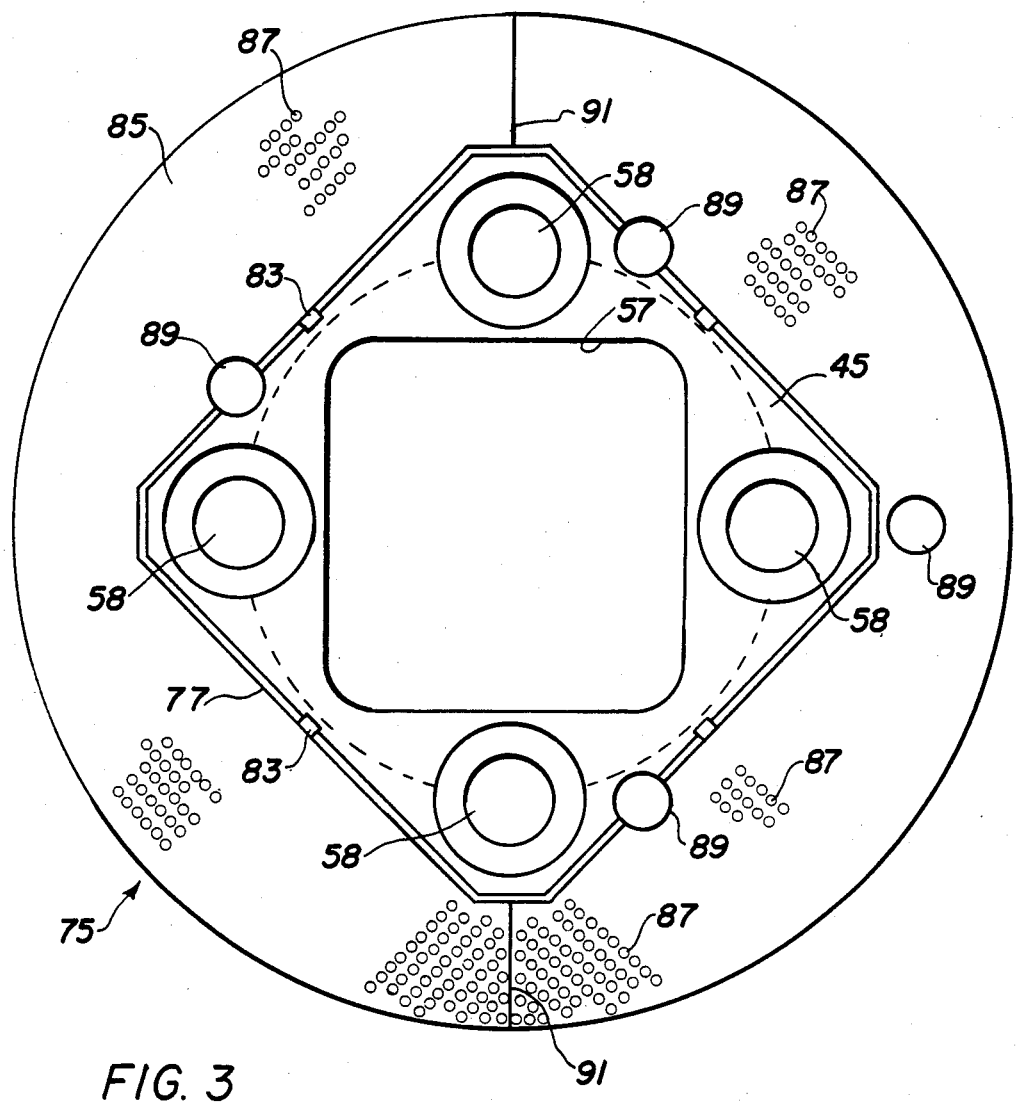
FIG. 3 is a plan view of the arrangement shown in FIG. 2.
Figure 4:
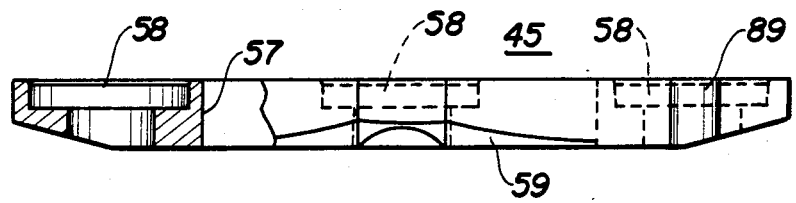
FIG. 4 is a side elevation view, partially sectioned, of a secondary core support base plate which forms part of the apparatus shown in FIGS. 1 through 3.

The enlarged views of FIGS. 2, 3 and 4 illustrate more clearly the details of the base plate 45 of the secondary core support 43. This base plate 45 is a square stainless steel plate with truncated corners and a large square aperture 57 through the center. It is mounted on the lower ends of the energy absorbers 49 which seat in the four counter bored apertures 58. The lower and side surfaces of the base plate 45 transition into a spherical surface 59 which conforms to the confronting surface 61 on the inner wall of the hemispherical lower head section 5 of the pressure vessel 3. The core barrel is suspended so that a radial gap 63 is defined by these spherical surfaces. The gap 63 is about 1.06 inches when the reactor is cold and narrows to about 0.5 inches when hot due to the differences in the coefficients of thermal expansion between the low alloy pressure vessel 3 and the stainless steel internals 17.

In operation of the reactor 1, reactor coolant, in the form of light water, enters the pressure vessel 3 through inlet nozzle 65 and flows downward through the annular space 67 called the downcomer between the pressure vessel inner wall 69 and the core barrel 19. From the downcomer, it passes into the lower hemispherical head 5 where it reverses direction and flows upward through passages 71 in the lower core support 23 and through the reactor core 27, before passing out through outlet nozzle 73. The reactor coolant discharged through the outlet nozzle circulates in an external loop (not shown) where the heat absorbed from fission reactions in the reactor core is used to produce steam for generating electricity. While only one inlet nozzle 65 and outlet nozzle 73 each are shown in FIG. 1, a typical PWR has two to four primary loops each having similar inlet and outlet nozzles.

Periodically, the reactor is shutdown for refueling. The head bolts 9 are removed and the hemispherical removable head 7 is lifted off. The top hat 35 is then lifted out bringing the upper core plate with it, thereby exposing the fuel assemblies in the core 27 which can be replaced and rearranged as desired. It is during this refueling process that debris could fall down into the lower head section. As also mentioned above, it is also possible for debris generated during failure of other hardware or repair work in the primary loops to be carried by reactor coolant into the reactor vessel where it too falls down into the lower hemispherical head section 5.

It is possible for some of this debris to become lodged in the gap 63 between the secondary core support base plate 45 and the lower hemispherical head 5 when the reactor is cold and the gap is at its maximum width. As the reactor heats up, the debris prevents the gap from narrowing and instead the differential thermal expansion of the pressure vessel and the internals causes the core barrel to unseat from the support flange 15 against the annular spring 39. This is an undesirable condition which could lead to unacceptable vibration of the core barrel and the connected components as a result of the turbulent reactor coolant flow.

In order to prevent this condition from occurring, a strainer member 75 is placed in the gap 63. The strainer member 75 is an annular stainless steel member having a central aperture defined by a thickened rim 77 which conforms to the peripheral configuration of the secondary core support base plate 45. The strainer member is mounted on the base plate 45 by welding the rim 77 to the side faces 81. Four inverted L-shaped stop members 83 welded to the center of each side of the rim 77 engage the top surface of the base plate 45 to set the vertical location of the strainer member. The main body of the strainer 75 is a planar section 85 which extends radially outward from the rim to the inner surface 61 of the lower hemispherical head 5 and is provided with apertures 87 through which reactor coolant, but not debris, may pass. Preferably, the planar section 85 is upwardly convex which increases the angle $\theta$ at which it contacts the surface 61. The strainer contacts the surface 61 when the reactor is in the cold state and it is resilient such that as the components heat up and the internals grow with respect to the pressure vessel so that the base plate 45 moves downward, the strainer flexes downward and maintains edge contact with the wall 61.

Circular cutouts 89 in the strainer 75 some extending partially into the base plate 45, accommodate the instrumentation thimbles 51 which extend upward into the reactor core 7. To facilitate installation of the strainer member 75, it is preferably fabricated in two halves and welded in place along the diagonal 91.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim as our invention:

1. In combination, an upright cylindrical nuclear reactor pressure vessel having a hemispherical lower head section with a curved inner surface and defining an annular flange extending radially inward near its upper end, reactor internals suspended within said pressure vessel from said flange, said internals extending downward into said hemispherical lower head section but with the lower end thereof terminating short of contacting the curved inner surface hemispherical lower head section to form a radially extending, annular gap therebetween which varies in size in response to variations in the temperature of reactor coolant circulated through the pressure vessel and internals due to a difference in the coefficients of thermal expansion thereof, and strainer means comprising an annular member with apertures therethrough smaller than the smallest size of said gap secured to the lower end of said reactor internals and extending radially outward therefrom, over the gap with an outer peripheral edge in contact with the curved inner surface of the hemispherical lower head section for all sizes of said gap to prevent debris from entering and lodging in said gap from above while allowing fluid to pass therethrough.

2. The combination of claim 1 wherein said annular strainer member is a resilient member which is fixed to the lower end of said internals with said outer peripheral edge pressed against the hemispherical lower head section of the vessel and which bends to maintain said outer peripheral edge in contact with the curved inner surface of the hemispherical lower head section of the vessel as the size of the gap changes.

3. The combination of claim 2 wherein said annular strainer member is curved in cross-section with a curvature which maintains said outer peripheral edge of the resilient annular member in contact with the inner surface of the hemispherical lower head section as the gap varies in size.

4. The combination of claim 3 wherein said annular member is convex upward in cross-section to increase over a flat annular member the angle at which the strainer member intersects the curved inner surface of the hemispherical lower head section of the vessel.

5. A nuclear reactor comprising:
an upright cylindrical pressure vessel having a hemispherical lower head section with a curved inner surface and defining an annular support flange extending radially inward near the upper end thereof;
a cylindrical core barrel having a radially outwardly extending flange at its upper end which seats on said support flange with the core barrel suspended inside the pressure vessel;
resilient means clamping said core barrel flange down onto said support flange;
secondary core support means depending from the bottom of the core barrel into the lower hemispherical head section and terminating at its lower end in a horizontally extending base plate which defines at its lower edges a spherical surface spaced from the inner surface of the hemispherical lower head section to define a radially extending, annular gap therebetween; and
strainer means for preventing debris from entering from above and lodging in said gap and lifting the flange on said core barrel up off of the support flange against said resilient clamping means as the core barrel and secondary core support expand more than the pressure vessel in response to heat-up of the reactor to reduce the size of said gap, said strainer means comprising an upwardly convex in cross-section, resilient, annular, member secured to the periphery of said base plate and extending radially outward therefrom over said gap to contact with a peripheral edge the inner curved surface of the hemispherical lower head section, and which bends to remain in contact therewith as said gap varies in size with temperature, said annular member defining apertures therethrough through which reactor coolant but not debris of a size which could lodge in said gap can pass into said gap from above.

* * * * *